US011367109B2

(12) United States Patent
Cattone

(10) Patent No.: US 11,367,109 B2
(45) Date of Patent: Jun. 21, 2022

(54) METHODS AND SYSTEMS FOR INTERACTIVE ADVERTISEMENTS

(71) Applicant: eBay Inc., San Jose, CA (US)

(72) Inventor: Jeremy Leigh Cattone, Tigard, OR (US)

(73) Assignee: EBAY INC., San Jose, CA (US)

( * ) Notice: Subject to any disclaimer, the term of this patent is extended or adjusted under 35 U.S.C. 154(b) by 1177 days.

(21) Appl. No.: 14/447,558

(22) Filed: Jul. 30, 2014

(65) Prior Publication Data

US 2016/0034964 A1  Feb. 4, 2016

(51) Int. Cl.
*G06Q 30/02* (2012.01)

(52) U.S. Cl.
CPC ..... *G06Q 30/0267* (2013.01); *G06Q 30/0255* (2013.01); *G06Q 30/0257* (2013.01); *G06Q 30/0261* (2013.01)

(58) Field of Classification Search
None
See application file for complete search history.

(56) References Cited

U.S. PATENT DOCUMENTS

| 8,396,517 | B2* | 3/2013 | Vartanian | G06Q 30/02 345/173 |
| 2002/0094787 | A1* | 7/2002 | Avnet | G06Q 30/02 455/68 |
| 2003/0006911 | A1* | 1/2003 | Smith | G06Q 30/02 340/988 |
| 2005/0021393 | A1* | 1/2005 | Bao | G06Q 30/02 705/14.64 |
| 2008/0153513 | A1* | 6/2008 | Flake | G06Q 30/02 455/456.3 |
| 2011/0282724 | A1 | 11/2011 | Hwang | |
| 2012/0179527 | A1* | 7/2012 | Ball | G06Q 30/0207 705/14.17 |
| 2012/0266191 | A1* | 10/2012 | Abrahamsson | G06Q 30/0224 725/35 |

(Continued)

OTHER PUBLICATIONS

M. Gerla, "Vehicular Cloud Computing," 2012 The 11th Annual Mediterranean Ad Hoc Networking Workshop (Med-Hoc-Net), 2012, pp. 152-155, doi: 10.1109/MedHocNet.2012.6257116. (Year: 2012).*

*Primary Examiner* — Sam Refai
*Assistant Examiner* — Rashida R Shorter
(74) *Attorney, Agent, or Firm* — Schwegman Lundberg & Woessner, P.A.

(57) ABSTRACT

Systems and methods are presented for providing interactive advertisements. In some embodiments, a method is presented. The method may include receiving, at a first advertising space, an indication that a first mobile device of a user is interacting with the first advertising space, the first advertising space displaying an advertisement. In response to the indication, the method may include transmitting information related to the advertisement from the first advertising space to the first mobile device. The method may also include receiving, at a second advertising space in a location geographically distinct from the first advertising space, the information related to the advertisement from a second mobile device; and displaying the advertisement at the second advertising space based on the information received at the second advertising space about the advertisement.

20 Claims, 10 Drawing Sheets

(56) References Cited

U.S. PATENT DOCUMENTS

2013/0091016 A1\* 4/2013 Shutter ................. G06Q 30/02
　　　　　　　　　　　　　　　　　　　　705/14.58
2013/0125014 A1\* 5/2013 Sharif-Ahmadi .... H04N 21/235
　　　　　　　　　　　　　　　　　　　　715/748

\* cited by examiner

METHODS AND SYSTEMS FOR INTERACTIVE ADVERTISEMENTS

TECHNICAL FIELD

The subject matter disclosed herein generally relates to consumer advertising. In some example embodiments, the present disclosures relate to systems and methods for interactive advertisements.

BRIEF DESCRIPTION OF THE DRAWINGS

Some embodiments are illustrated by way of example and not limitation in the figures of the accompanying drawings.

DETAILED DESCRIPTION

Example methods, apparatuses, and systems are presented for propagating advertisements through customer interactions or other user interactions. In some example embodiments, a viewer of an advertisement on a billboard, kiosk, sign, or other advertising space can obtain a copy of the advertisement on his or her mobile device through a wireless means while near the advertisement, such as accessing a quick response (QR) code to download the advertisement. Using the mobile device, the viewer can travel to a second billboard, kiosk, sign, or other advertising space in a location geographically distinct from where the advertisement was first obtained, and propagate the advertisement to the second advertising space. The viewer may be incentivized to propagate the advertisement by receiving some reward related to the advertisement, after propagating the advertisement to another location. In some example embodiments, a merchant paying for advertising space can pay for an initial advertising space, and can rely on viewer participation to propagate the advertisement to relevant locations, thereby possibly saving on costs for advertising. In some example embodiments, merchants or companies can track the locations of the propagated advertisements for marketing research purposes, for example, to assess where interested viewers of the advertisement travel to or gather. These and other embodiments will be discussed in more detail in accordance with the example figures below.

Figure 1:
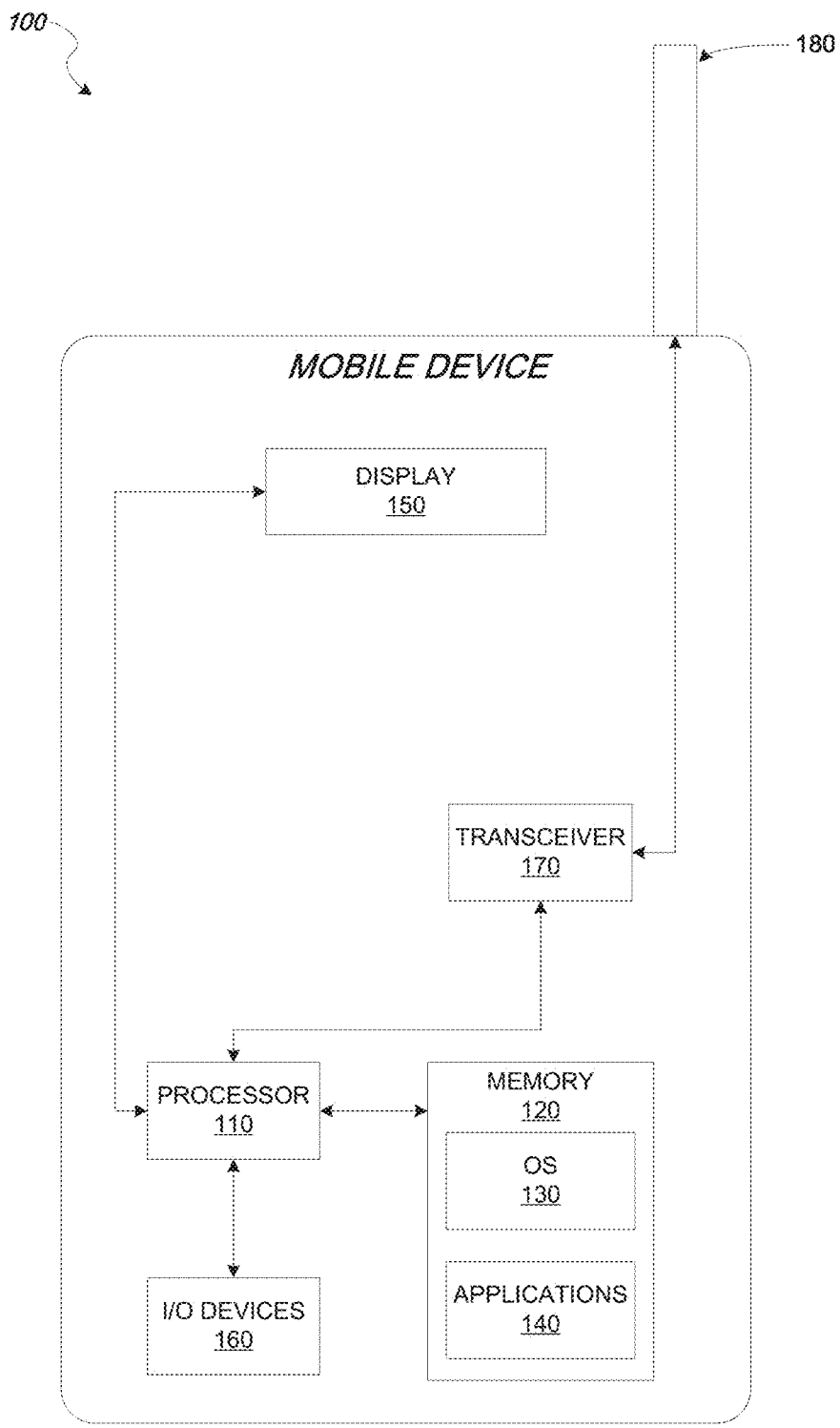
FIG. 1 is a mobile device suitable for interacting with advertisements, according to some example embodiments.

Referring to FIG. 1, a block diagram illustrating a mobile device 100 is presented, according to some example embodiments. The mobile device 100 may be configured to access an advertisement on a kiosk or other type of advertising space, and propagate that advertisement to a second kiosk or advertising space. The mobile device 100 may be configured to display the advertisement on a display 150, for example, in a user interface (UI) generated from an application running on the mobile device 100.

The mobile device 100 may include a processor 110. The processor 110 may be any of a variety of different types of commercially available processors suitable for mobile devices (e.g., an XScale architecture microprocessor, a Microprocessor without Interlocked Pipeline Stages (MIPS) architecture processor, or another type of processor). The processor 110 may be configured to run the application to display the advertisement in the display 150, as well as facilitate reception and transmission of the advertisement via a transceiver 170.

A memory 120, such as a random access memory (RAM), a Flash memory, or other type of memory, is typically accessible to the processor 110. The memory 120 may be adapted to store an operating system (OS) 130, as well as application programs 140, such as a mobile application for receiving and transmitting advertisements from and to nearby advertising spaces, respectively.

The processor 110 may be coupled, either directly or via appropriate intermediary hardware, to the display 150 and to one or more input/output (I/O) devices 160, such as a keypad, a touch panel sensor, a microphone, and the like. Similarly, in some embodiments, the processor 110 may be coupled to a transceiver 170 that interfaces with an antenna 180. The transceiver 170 may be configured to both transmit and receive cellular network signals, wireless data signals, or other types of signals via the antenna 180, depending on the nature of the mobile device 100. Additionally, the transceiver 170 may receive and transmit signals related to an advertisement. In this manner, a connection to various advertising kiosks or other advertising spaces may be established.

Figure 2:
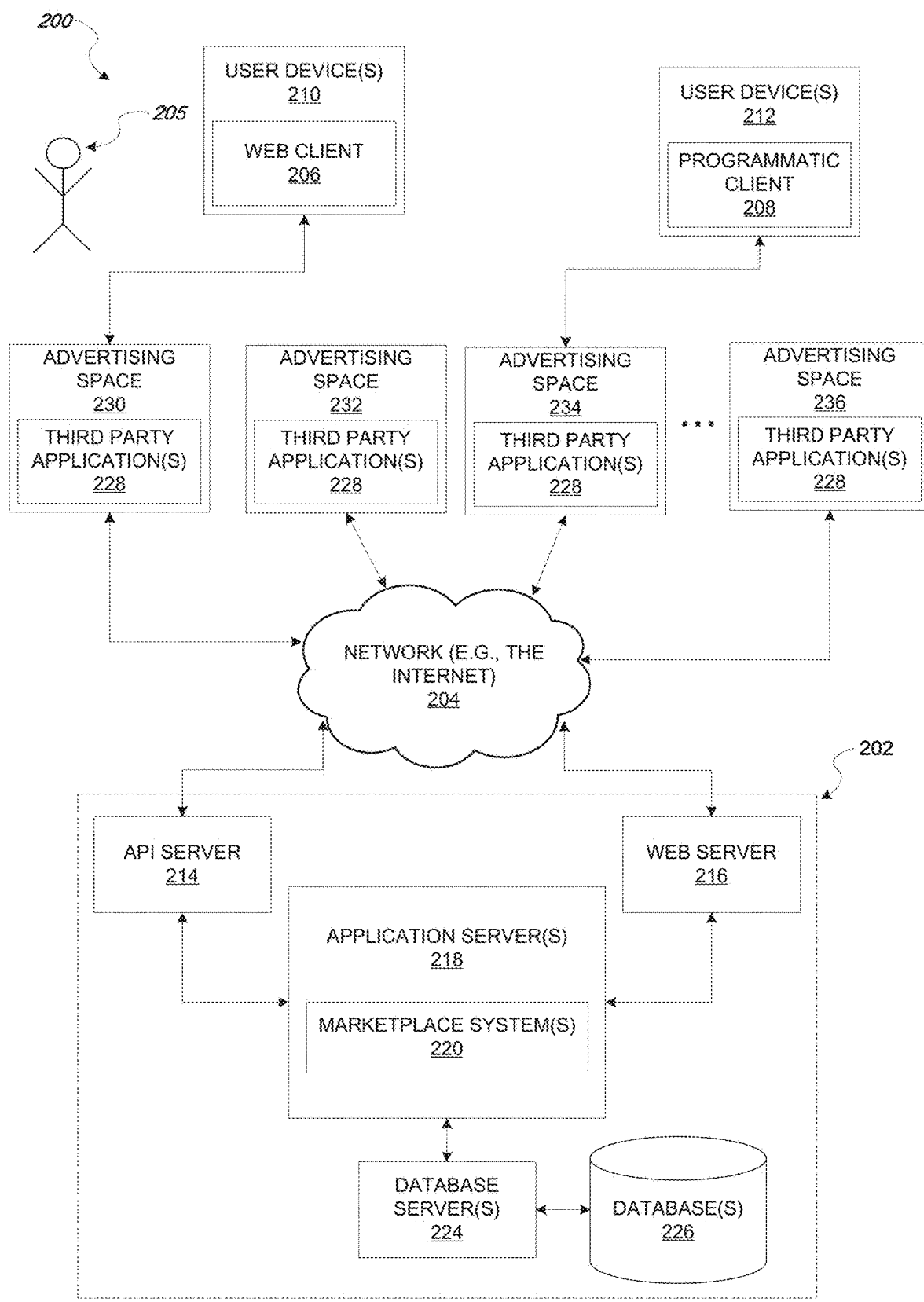
FIG. 2 is a network architecture suitable for providing interactive advertisements, according to some example embodiments.

Referring to FIG. 2, a high-level network architecture 200 of a plurality of advertising spaces is shown, according to some example embodiments. The network architecture 200 may include systems, applications, modules, or other means for utilizing aspects of the present disclosures, as may be apparent to those with skill in the art. For example, the network architecture 200 may include means for displaying an advertisement in an advertising space, such as a kiosk, enabling a user device, such as the mobile device 100, to download or otherwise obtain some version of the advertisement from a first advertising space, and accept an upload of the advertisement or related version thereof from the user device at a second advertising space, according to aspects of the present disclosure. Example means for facilitating interactions between a plurality of advertising spaces and a user device can include contactless identifiers, such as QR codes and radio frequency identifiers (RFIDs) residing near the advertising space, and other means according to principles and concepts consistent with aspects of the present disclosure and described more below.

The network architecture 200 may facilitate the propagation of advertisements for merchants. In some example embodiments, a networked system 202 may facilitate a network-based marketplace system 220, providing server-side functionality via a network 204 (e.g., the Internet or wide area network (WAN)) to one or more kiosks 230, 232, 234, and 236, and ultimately to user devices 210 and 212. FIG. 2 illustrates, for example, a web client 206 (e.g., a browser, such as the Internet Explorer® browser developed by Microsoft®) and a programmatic client 208 executing on respective user devices 210 and 212.

As previously mentioned, the network architecture 200 can include a. network of advertising spaces 230, 232, 234, and so on up to 236. The advertising spaces 230-236 each can be located in geographically distinct areas, separate from one another, and located in various places that may or may not be common for advertising. For example, advertising space 230 may be a located on a side of a bus stop structure, while advertising space 232 may be a kiosk display located in an indoor mall. The advertising spaces 230-236 may be communicatively coupled through wired or wireless means, such as through the network 204. In some example embodiments, third party application(s) 228 may be installed into memory in one or more of the advertising spaces 230-236, and a processor in the advertising spaces 230-236 may display one or more advertisements in a display based on instructions provided by the third party application(s) 228. In some example embodiments, the advertising spaces 230-236 may receive information associated with advertisements from the networked system 202 through the network 204. In some example embodiments, the advertising spaces 230-236 can interact with the user devices 210 or 212 through contactless means, such as through a wireless identifier like a QR code or an RFID tag. The wireless identifier could be visible on or near each of the advertising spaces 230-236. The user devices 210 and 212 may record the QR code, and thereby obtain information associated with the advertising space of the associated QR code, as an example.

Examples of the user devices 210 and 212 may include, but are not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes (STBs), wearable devices, or any other communication device that a user may utilize to interact with the one or more advertising spaces 230-236, such as advertising space 230. Example user devices 210 and 212 may be consistent with the mobile device 100 described in FIG. 1. In some embodiments, the user device 210 may comprise a display module (not shown) configured to display information (e.g., in the form of user interfaces) and images. In further embodiments, the user device 210 may comprise one or more of touch screens, accelerometers, gyroscopes, cameras, microphones, global positioning system (GPS) devices, and so forth. The user devices 210 and 212 may receive advertising information from an advertising space, such as any of the advertising spaces 230-236, and may transmit the advertising information to another advertising space.

In some example embodiments, the networked system 202 includes a network-based marketplace that responds to requests for product listings, publishes publications comprising item listings of products available on the network-based marketplace, and manages payments for these marketplace transactions. The product listings may include products associated with advertisements displayed in the advertising spaces 230-236.

One or more users 205 may be a person, a machine, or other means of interacting with the user devices 210 and 212. In embodiments, the user 205 is not part of the network architecture 200, but may interact with the network architecture 200 via the user devices 210 and 212 or another means.

An application program interface (API) server 214 and a web server 216 may be coupled to, and provide programmatic and web interfaces respectively to, one or more application servers 218. The application servers 218 may host one or more marketplace systems 220, which may comprise one or more modules or applications and which may be embodied as hardware, software, firmware, or any combination thereof. The application servers 218 are, in turn, shown to be coupled to one or more database servers 224 that facilitate access to one or more information storage repositories or database(s) 226. In some example embodiments, the databases 226 are storage devices that store information to be posted (e.g., publications or listings, images of products, etc.) to the marketplace system(s) 220. The databases 226 may also store digital information about various items in a retailer's inventory, in accordance with example embodiments.

The marketplace system(s) 220 may provide a number of marketplace functions and services to the users 205 that access the networked system 202. For example, the marketplace system 220 can allow for rewards, discounts, or other incentives related to advertisements to be supplied to the user 205 who transmits or more generally, propagates an advertisement from one advertising space 230-236 to another. A signal can be sent from an advertising space that received the advertisement from the user device 210 or 212 through the network 204 and into the networked system 202. The registration of that acknowledgement can trigger a reward or other response to be sent back through the network 204, through the advertising space and ultimately to the user device 210 or 212. While the marketplace system(s) 220 is shown in FIG. 2 to form part of the networked system 202, it will be appreciated that, in alternative embodiments, the marketplace system(s) 220 may form part of a payment service that is separate and distinct from the networked system 202.

Further, while the client-server-based network architecture 200 shown in FIG. 2 employs a user-server architecture, the present inventive subject matter is, of course, not limited to such an architecture, and may equally well find application in a distributed, or peer-to-peer, architecture system, for example. The various marketplace system(s) 220 may also be implemented as standalone software programs, which do not necessarily have networking capabilities.

The web client 206 accesses the various marketplace system(s) 220 via the web interface supported by the web server 216. Similarly, the programmatic client 208 accesses the various services and functions provided by the marketplace system(s) 220 via the programmatic interface provided by the API server 214. The programmatic client 208 may, for example, be a seller application (e.g., the Turbo Lister application developed by eBay® Inc.) to enable sellers to author and manage listings on the networked system 202 in an off-line manner, and to perform batch-mode communications between the programmatic client 208 and the networked system 202.

Additionally, the third party application(s) 228, executing on one or more advertising spaces 230-236, is shown as having programmatic access to the networked system 202 via the programmatic interface provided by the API server 214. For example, the third party application 228, utilizing information retrieved from the networked system 202, may support one or more features or functions on a website or digital advertising display hosted by a third party. The third party may own or control one or more of the advertising spaces 230-236, where the third party may be a separate entity from an entity owning or controlling networked system 202. The third party website or display may, fir example, provide one or more promotional, marketplace, or payment functions that are supported by the relevant applications of the networked system 202. The third party application(s) 228 may help distribute, proliferate, or propagate offers or advertisements for items owned or controlled by the third party, through one or more of the advertising spaces 230-236.

Figure 3:
FIG. 3 is an illustration of an example advertisement suitable for employing aspects of the present disclosure.

Referring to FIG. 3, an example advertisement 300 is shown, that can be displayed as an advertisement and interacted with by a user according to aspects of the present disclosure. Here, the advertisement 300 may feature a home for sale, created by a real estate agent responsible for selling the home. As with most advertisements for house for sale, a description of important features about the home may be included, along with one or more pictures of the home. Other information, such as an address of the house, contact information, and any other enticing features about the house or related areas around the house can be included In some cases, the advertisement 300 may feature additional information that may not be common to most advertisements. The information may be more pertinent to the context in the present disclosure. For example, information about a reward or some incentive for passing on this advertisement 300 to another advertising space or through other means may also be posted in the advertisement 300. Here for example, the bottom of the advertisement 300 reads, "Help get the word out! Pick this up and drop it of in the washer and dryer will be included if you close!" As discussed above, and as will be discussed in more detail below, aspects of the present disclosure may allow for advertisements to be propagated by viewers of the advertisements, while providing a reward or incentive to the viewer to propagate the advertisement. In this case, this home advertisement 300 can be displayed in a digital advertising space according to some example embodiments. The sales agent may have generated the advertisement 300 or sought help in its generation, and may have displayed the advertisement 300 in just a few locations at first.

Figure 4:
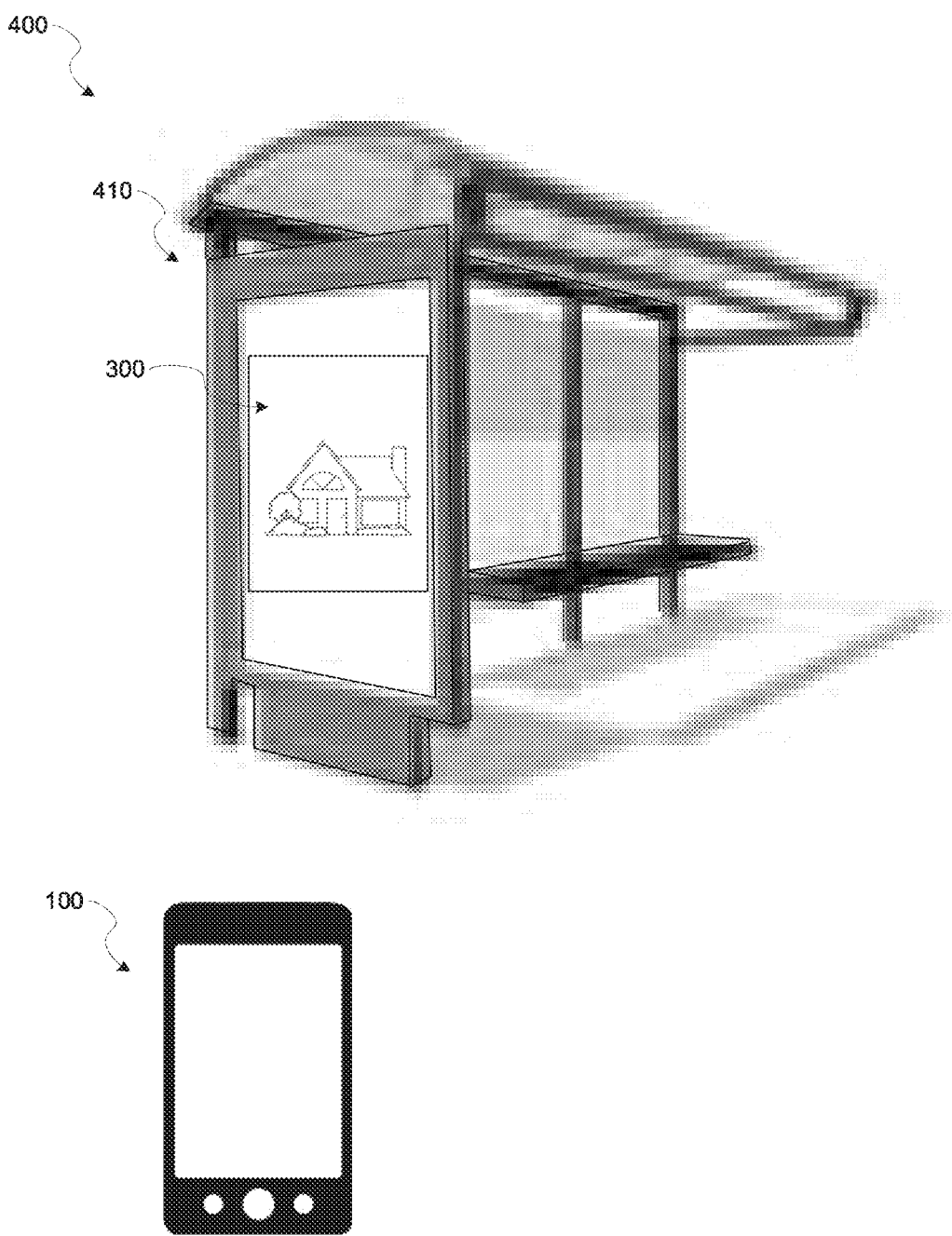
FIG. 4 is an example advertising space interacting with a mobile device, according to some example embodiments.

Referring to FIG. 4, illustration 400 shows an example scenario for providing interactive advertisements to viewers according to aspects of the present disclosure. Here, advertising space 410 can be a digital advertising space on a side of a bus stop. The advertising space 410 can be connected via wired or wireless means to a centralized networking server, wherein the centralized networking server could facilitate the generation and display of an advertisement, such as advertisement 300, in advertising space 410. The advertising space 410 can be consistent with one or more of the advertising spaces 230-236, as described in FIG. 2. The networking server may be consistent with the networked system 202 as described in FIG. 2.

In some example embodiments, the advertising space 410 can have an advertisement stored in memory and displayed through local means, such as having inputs for uploading one or more digital advertisements locally at the advertising space 410, such as through a USB port connected to a small computer at advertising space 410, or through a wireless receiver configured to receive or accept a wireless upload of one or more advertisements, and the like. In some example embodiments, in order to use the local means to upload an advertisement, the user may need to enter a security code or provide some other authenticated means signaling authorization to interface with the advertising space 410. Through these example methods for storing and displaying an advertisement on the advertising space 410, or through other similar means apparent to those with skill in the art, the advertisement 300, as described in FIG. 3, can be displayed in the advertising space 410, as shown. Certainly, the advertisement 300 is merely one of a vast number of advertisements that can be displayed in advertising space 410, and embodiments are not so limited.

In some example embodiments, the owner or creator of the advertisement 300 may have displayed advertisement 300 by physically accessing advertising space 410. The owner may have entered a security code at or near advertising space 410, signaling authorization to upload advertisement 300 into advertising space 410. In other cases, the owner of the advertisement may be allowed (freely, or by use of a limited-use token) to remotely send content to an advertising space that he has previously visited physically. This may allow, for example, for the owner to canvas his local environment for ad space meeting his needs for secondary content (a real-estate ad, for example), and then at home, he may selectively send his ad to the best of the ad spaces he encountered.

Still referring to FIG. 4, aspects of the present disclosure can allow for the viewer of the advertisement 300 to download a copy of the advertisement 300 onto his mobile device, such as the mobile device 100 described in FIG. 1. For example, the viewer may be waiting at the bus stop comprising the advertising space 410 and may be interested in buying the home for sale described in the advertisement 300. Being potentially interested, the viewer may note the reward or incentive described at the bottom of the advertisement 300, which states, "Help get the word out! Pick this up and drop it off in the washer and dryer will be included if you close!" The viewer may understand that if he follows the directions listed in the advertisement 300, and he ends up purchasing the home, he stands to gain a free washer and dryer included with the home, which could amount to several hundred dollars or more, Based on this example incentive, the viewer may "pick up" the advertisement 300 by downloading it onto his mobile device 100. The viewer may accomplish this by accessing a local tag, code, or some other identifier, such as a QR code located on advertisement 300 or elsewhere on the advertising space 410 that is present when the advertisement 300 is being displayed. For example, the viewer can capture the QR code associated with the advertisement 300, and based on the code, download the advertisement 300 onto his mobile device 100.

In some example embodiments, other example incentives are available, based on the content of what is in the advertisement. For example, an advertisement for a new movie can be displayed in the advertising space 410. The viewer may be incentivized to download the movie advertisement based on a description in the movie advertisement to receive a coupon for purchasing a ticket to view the movie. As another example, an advertisement for a restaurant or a collection of restaurants can be displayed in the advertising space 410. The viewer may be incentivized to download the restaurant advertisement based on a description in the restaurant advertisement to receive a coupon for a next meal at the restaurants, or a free meal or part of a meal after participating in these advertisement interactions five times or more. Certainly, other types of incentives are also possible, with other examples being described in more detail, below.

Figure 5:
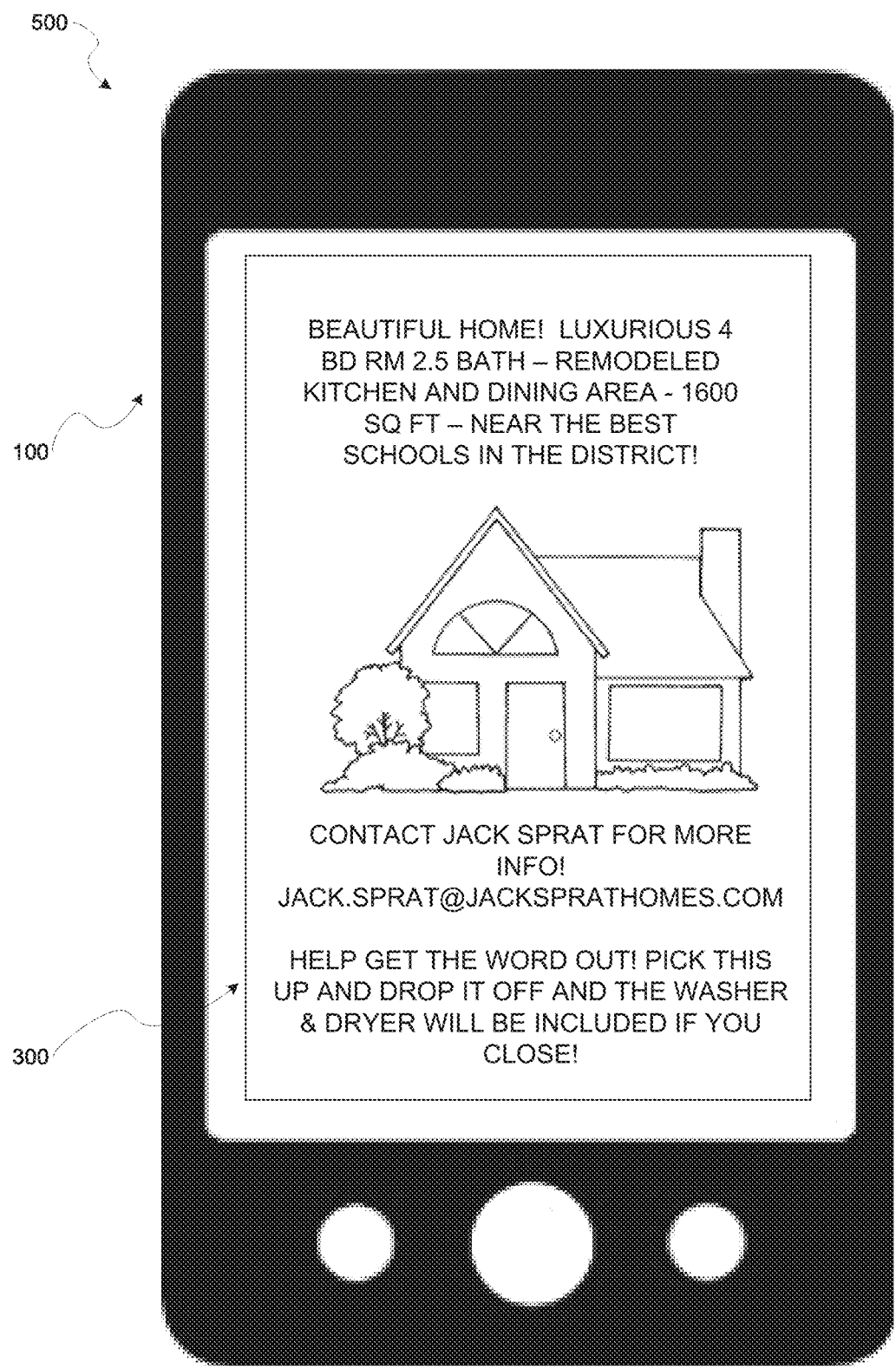
FIG. 5 is an example mobile device interacting with an advertisement, according to some example embodiments.

Referring to FIG. 5, illustration 500 shows how the example advertisement 300 can be received or "picked up" by the mobile device 100, according to aspects of the present disclosure. For instance, from the example scenario described in FIG. 4, a viewer of the advertisement 300 in the advertising space 410 may wish to download the advertisement 300 onto his mobile device 100. Example methods for downloading the advertisement 300 onto the mobile device 100 can include the example descriptions described in FIG. 4. In addition other possible examples can include scanning or accessing an RFID tag located on the advertisement 300 or somewhere else on the advertising space 410. The mobile device 100 can then download a copy of the advertisement 300 based on the scanned RFID tag. Other example means for accessing the advertisement 300 from mobile device 100 may be apparent to those with skill in the art, consistent with the descriptions herein, and embodiments are not so limited. In some cases, the advertisement 300 need not be displayed on the mobile device 100. For example, the downloaded advertisement 300 can appear merely as a file in an application residing on the mobile device 100.

Figure 6:
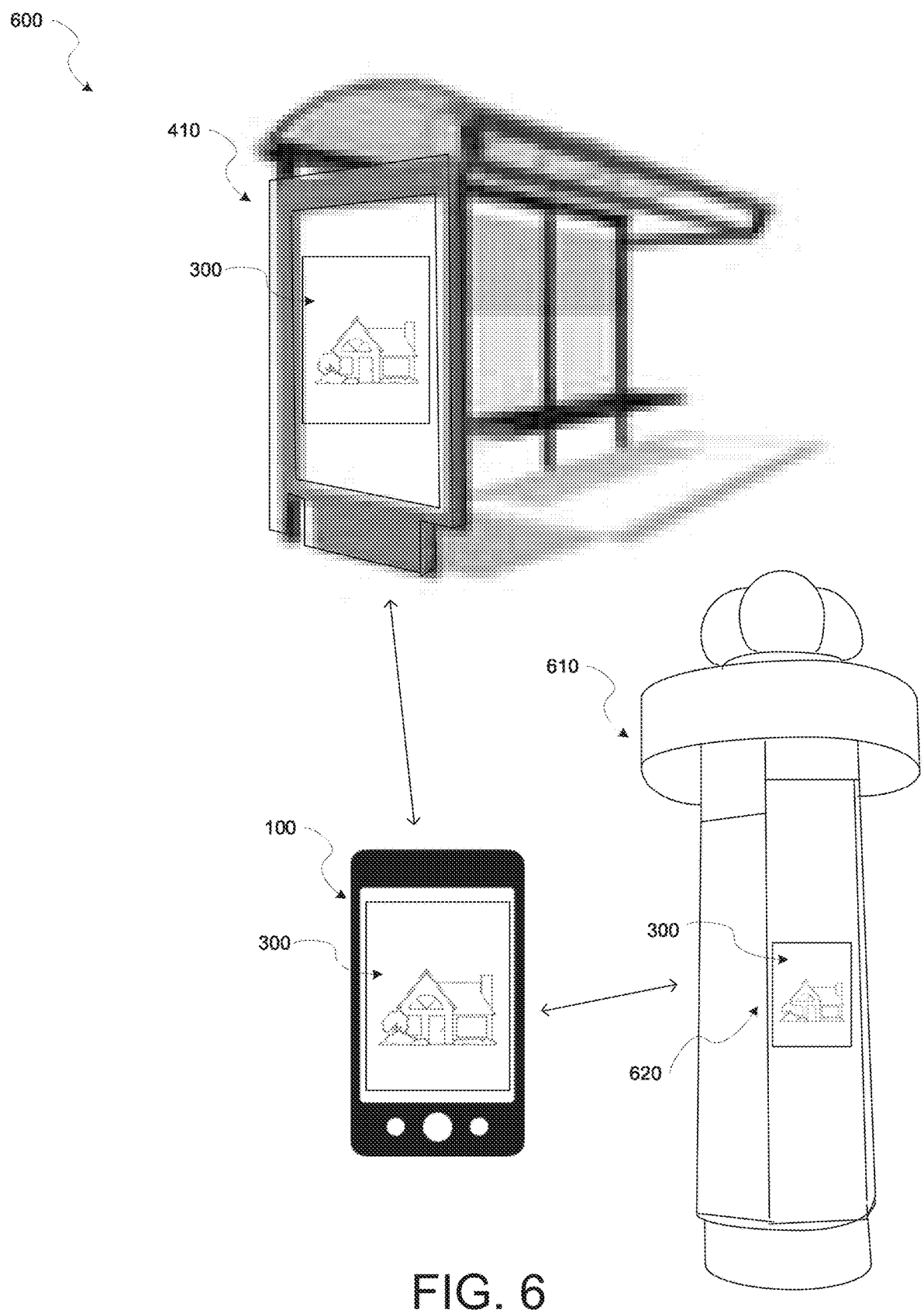
FIG. 6 illustrates a scenario of a mobile device interacting with advertising spaces according to aspects of the present disclosure.

Referring to FIG. 6, illustration 600 shows the advertisement 300 being transferred from the advertising space 410 to another advertising space 620, according to some example embodiments. From the descriptions of FIGS. 4 and 5, the advertisement 300 originally displayed in advertising space 410 can be downloaded (e.g., "picked up,") by the mobile device 100, as shown. The viewer may have had an incentive to "pick up" the advertisement 300, based on a description in the advertisement 300 promising some incentive or reward.

To complete the steps needed to achieve the incentive or reward, the viewer is asked to "drop off" the advertisement 300. In some example embodiments, this may involve the advertisement 300 being uploaded to a kiosk 610 containing an advertising space 620 suitable for receiving a copy of the advertisement 300. The kiosk 610, along with the advertising space 410, may be two of a number of advertising spaces forming a network of advertising spaces, consistent with the descriptions of the network of advertising spaces described in FIG. 2. Here, for example, the viewer, having initially downloaded the advertisement 300 onto his mobile device 100, thereafter may move to a second geographic location containing the kiosk 610. For example, the viewer may have boarded a bus after waiting at the bus stop containing the advertising space 410, and traveled to another location within his city to another bus stop having the kiosk 610 nearby. To upload the advertisement 300 into advertising the space 620, the viewer may place his mobile device 100 near a scanner at or around the advertising space 620. The scanner may be configured to read an RFID tag or a QR code, or some other kind of unique identifier associated with the advertisement 300 that was recorded in the mobile device 100 when the viewer "picked up" the advertisement 300 from the advertising space 410. Once the unique identifier associated with the advertisement 300 has been accessed by the advertising space 620, the picture of the advertisement 300 can be accessed and displayed in the advertising space 620 by, for example, accessing through the networked system 202 the picture of advertisement 300 associated with the unique identifier. In other cases, the advertising space 620 or the kiosk 610 may not have networked access to the picture associated with advertisement 300. Thus, in some example embodiments, a copy of the advertisement 300 can be uploaded to the advertising space 620, similar to how pictures from one's mobile device can be uploaded to social networking sites.

In some example embodiments, once the transfer of the advertisement 300 to the advertising space 620 is complete, a digital acknowledgment may be exchanged between the advertising space 620 and the mobile device 100, sufficient to signal completion of a condition for the incentive or reward described in advertisement 300. For example, the viewer can receive a special rewards code that an owner of the advertisement 300 has access to. As another example, a coupon, certificate, or stamp of completion can be downloaded into an application on the mobile device 100 in accordance with some example embodiments. In other cases, where the incentive or reward is tied automatically to a reward account or some other user account associated with the advertising system, the advertising space 620 can transfer or transmit a token or some other digital acknowledgment to the reward account.

After completing the transfer process of the advertisement 300 to the advertising space 620, the advertisement 300 can be displayed in the advertising space 620, thus enabling the advertisement 300 to be displayed in multiple spaces white having originated from just a single location. In some cases, a previous advertisement may be present in advertising space 620. In some example embodiments, the multiple advertisements can share advertising time, by the advertising space 620 switching between the multiple advertisements based on some regular interval (e.g., every 15 seconds). In other cases, the advertisement 300 can completely supersede the previous advertisement, such that only the advertisement 300 may be displayed thereafter, or at least until a new advertisement has been uploaded into the advertising space 620, according to aspects of the present disclosure. For example, the owner of advertisement 300 may have paid more to a third-party company controlling a network of advertising spaces, such that his advertisements have more weight and would take precedence over other advertisements when they are propagated by devices like the mobile device 100.

In some example embodiments, users of the mobile device 100 "dropping off" the advertisement 300 may be allowed to supply custom context as a secondary payload of the advertisement transfer. For example, the user could enter his or her initials to be displayed somewhere in the advertising space 620, although various types of customizations are possible, and embodiments are not so limited.

Aspects of the present disclosure can allow for advertisers to economically display and propagate their advertisements by, for example, not paying initially for a large amount of advertising space. Aspects of the present disclosure therefore can allow smatter companies or smaller entities to efficiently display their advertisements in spaces that may be more relevant to the viewers. For example, the viewer of the advertisement 300 may have uploaded the advertisement 300 into the advertising space 620, wherein the associated kiosk 610 is located at a bus stop near where the viewer lives. The owner of the advertisement 300 may opt for this, reasoning that residents near the viewer may be like minded, and thus where the viewer may travel and propagate the advertisement 300, so too may other, similar viewers be located.

The owner of advertisement 300 may not at first know where the most relevant locations to display advertisement 300 are, and thus, can use the self-propagating properties according to aspects of the present disclosure to more efficiently place his advertisement 300 at relevant locations. In addition, aspects of the present disclosure can allow the owner of advertisement 300 and/or the third party in control of the network of advertising spaces to monitor where the advertisements travel. In this way, advertisers can learn where common locations that the viewers of the advertisements may travel to are located. As another example, advertisers could learn where the most frequent locations that viewers of a movie advertisement might travel to are located, and an forth.

In some example embodiments, the incentives or rewards to the viewer can be augmented or modified to give the viewer additional entertainment or other value when propagating advertisements. For example, an application on the mobile device 100 may contain a game having a quest or a mission to complete, based on "picking up" and "dropping off" multiple advertisements to multiple locations. As another example, a game associated with aspects of the present disclosure can be designed in the form of a scavenger hunt or a mystery game, whereby viewers of the advertisements could pick up clues or other fun facts, in addition to the incentive or reward originally associated with the advertisement when completing propagation of the advertisements.

In some example embodiments, in addition to the incorporation of advertisement transfer as a direct in-game goal or activity, incentives from out-of-game advertisement transfers could be issued in the form of credits within a game, or entertainment ecosystem. Additionally, advertisement content could be seamlessly merged into gaming environments, with advertisement content being rendered within the virtual environment of the game. For example, an urban combat game might display ad content on billboards or storefronts that normally appear within the game, whereas locale-based games might be able to show advertisements in virtual locations corresponding to physical real-world locations.

Figure 7:
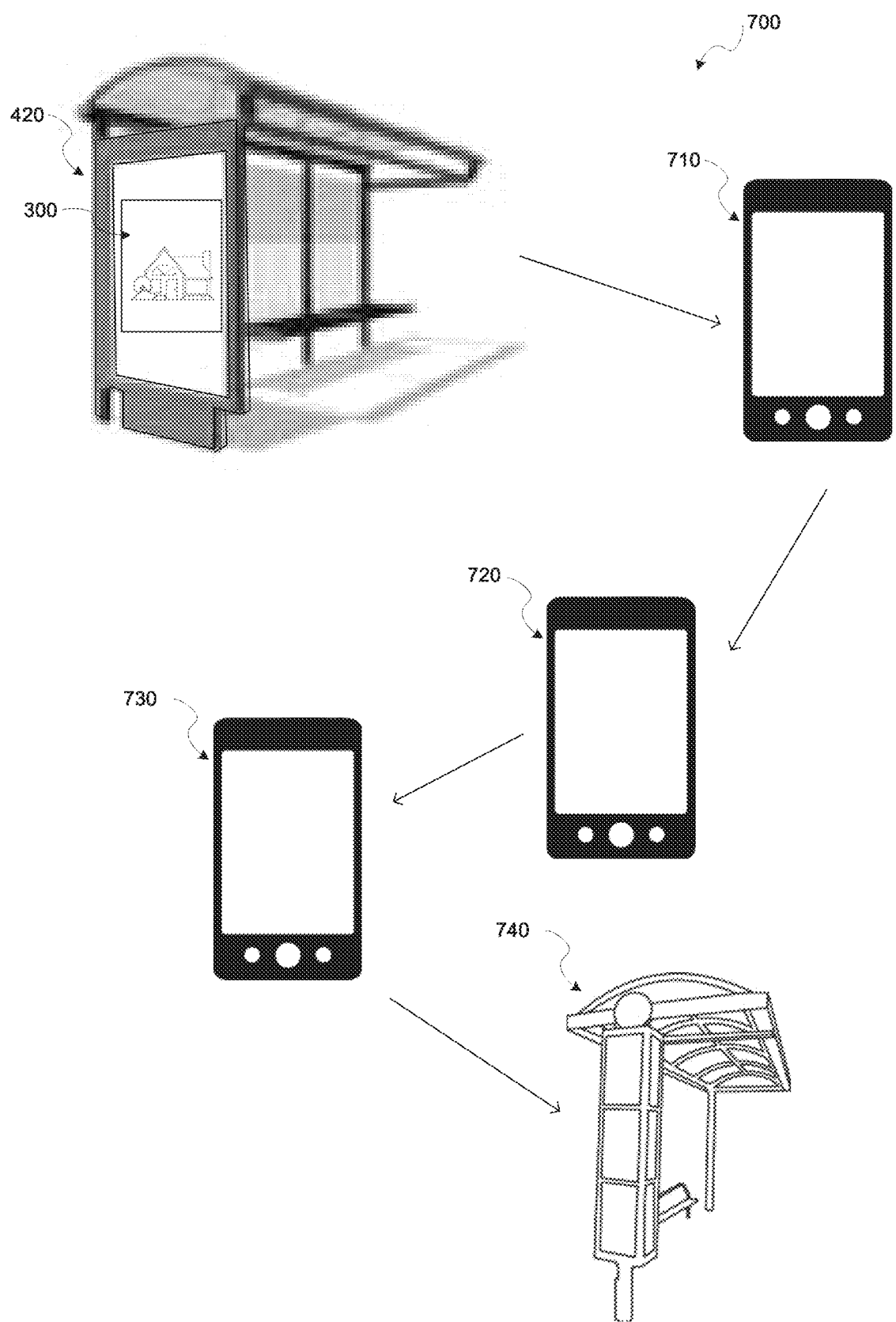
FIG. 7 illustrates a broader example scenario of multiple mobile devices interacting with an advertisement according to aspects of the present disclosure.

Referring to FIG. 7, in some example embodiments, the advertisement propagation techniques described herein can be extended or modified to include multiple exchanges from multiple mobile devices of users, including some users who may not have even seen the original advertisement. As an example, illustration 700 shows how the advertisement 300, originally displayed in the advertising space 420, can be propagated to multiple mobile devices (e.g. mobile devices 710, 720, and 730), and may ultimately be propagated to another advertising space at kiosk 740. While techniques for actively propagating the advertisement 300 have been described, in some example embodiments, an application on the mobile devices 710, 720, and 730 can be configured to passively receive the advertisement 300 or at least information associated with the advertisement 300.

For example, a first user having the mobile device 710 can walk by the advertisement space 410, which is displaying the advertisement 300. A transmitter associated with the advertising space 410 can periodically transmit signals associated with the advertisement 300 to any mobile devices configured to receive these signals. An application on the mobile device 710 can enable the mobile device 710 to receive the signals, and thus as the user carries the mobile device 710 past the advertising space 410, information associated with the advertisement 300 can be received at the mobile device 710.

Next, the first user carrying the mobile device 710 can walk by a second user carrying the mobile device 720, where an application, according to an example embodiment, can also be installed on the mobile device 720. In a similar fashion, the mobile device 710 can periodically transmit signals associated with the advertisement 300 to any mobile devices nearby configured to receive such signals. Thus, as the first user passes by the second user carrying the mobile device 720, the mobile device 720 can receive the signals or information associated with the advertisement 300.

The same or similar techniques can be applied to allow the third user carrying the mobile device 730 to pick up the advertisement 300. Many other users carrying other mobile devices can similarly pick up the advertisement 300, either from the third user carrying the mobile device 730, or in some example embodiments, from any of the previous mobile devices 710 or 720 that may still contain information associated with the advertisement 300. Thus, in some cases, the propagation techniques can be described in a daisy-chained fashion, and in other cases, the propagation techniques can be described in a ripple-effect fashion.

In some cases, a mobile device having the advertisement 300 can ultimately drop off the advertisement 300 to another kiosk, such as kiosk 740. In some cases, the techniques for transferring the advertisement 300 to the kiosk 740 can be consistent with the descriptions above. In other cases, the transfer to the kiosk 740 can be done in a passive manner similar to those device-to-device transfers described here with reference to FIG. 7.

The propagation of advertisements through multiple devices as described in FIG. 7, according to some example embodiments, can allow for easier propagation from one advertising space to another. For example, users carrying mobile devices may not need to actively participate in the propagating of advertisements, such as being incentivized to receive any of the rewards offered by advertisement owners. Instead, advertisements can travel across multiple mobile devices in a sort of organic or more natural manner. In some cases, the descriptions in FIG. 7 can allow for the advertisements to travel farther distances.

In addition to propagation of advertisements starting from one stationary body, such as a kiosk, ultimately to another stationary body, the concepts of mesh networking are possible in some example embodiments. That is, instead of transfers occurring between kiosk and device, with only one device-to-device transfer, any number of intermediary devices could participate in the propagation of ad data. Further, mesh networking of advertisement propagation also allows for mobile equivalents to stationary kiosks, meaning vehicles and other non-stationary participants in the mesh network could act in a role equivalent to kiosks, or in a "seed" mode in which the advertising spaces push new content into devices such as mobile device 100 in the nearby mesh environment. For example, a non-stationary vendor cart at a concert could be "seeding" the local mesh environment with ad data specific to the vendor's products, optionally tagged such that the concert venue and performing artist share fractionally in any attributed revenue.

In addition to physical kiosks or advertising spaces, in some example embodiments, virtual environments can enable equivalent functionality through a location identified by geographic location, beacon, or any other means of identifying a region of space without respect to the physical surroundings. For example, the advertisement propagation methods described herein can also be relevant for augmented reality environments ranging from games to more mundane "check-in" and mapping scenarios.

In some example embodiments, advertisement owners or third-party entities in control of the network of advertising spaces can track the movements of the advertisements. For example, various metadata can be included across each transfer from one mobile device to another, the metadata possibly describing when the advertisement was transferred, at approximately what location the advertisement was transferred, what kind of mobile device was used to transfer the advertisement, and so forth. The various metadata can be used to gain insight as to where users may travel to, which may help determine better what kinds of advertisements to display. A centralized system, such as networked system 202, can be one example of a system configured to track the movements of the advertisements. The networked architecture described in FIG. 2 may allow for location data and other metadata to be transmitted by advertising spaces 230-236 to networked server 202, which can aggregate the data to obtain a more complete picture of where the advertisements travel to.

While use of third party applications 228 has been described for displaying ad information, in some example embodiments, an analogous client-based scenario is possible. For example, with ad information having been transferred to the mobile device 100, this ad data can form a cache of local ad data, Other applications on the mobile device 100 may be enabled to pull their ads directly from these local caches of ad data, or to query the local network environment (e.g., in a mesh computing scenario) for ad data. In the former scenario, consumers of the local cache can display ads with high relevancy to the user's recent activities. In the latter scenario, the applications on the mobile device 100 can pull ads from nearby devices, allowing for crowd-based propagation of advertisements. Both of these mechanisms can be augmented using segmentation and demographic targeting techniques, permit ad delivery without the use of a. centralized ad server, and may offer improved user perception of privacy/tracking characteristics when compared to centralized ad distribution networks.

In some example embodiments, a secondary channel of advertising information can be displayed on partnered screens on or near the advertising space, such as advertising spaces 230-236. This secondary channel may owned or controlled either by the owners of the advertising space, or by another entity, including the entity owning or controlling the server connecting the advertising spaces, such as network server 202. Given an advertising space whose primary content is determined by the propagated ads, the ad content, tags, demographics, etc., can be used to filter, tune, or parameterize the content displayed on the secondary screen. For example, the secondary screen may show content that is controlled by networked server 202 and is dynamically adjusted to reflect listings relevant to the ads transferred to the associated advertising space. For example, if the propagated ad is an advertisement for a sale of a home, then the secondary channel may be adjusted to display advertisements for other types of home sales, or advertisements for mortgage lending.

In some example embodiments, a "time-to-live" parameter with end-of-life behavior and content fallbacks may be incorporated to the advertisement propagation. For example, ads may be limited to a certain chronological age from introduction into the network, from the time last present on an advertising space, from the time last transferred. Similarly, advertisements may be limited to transfer within some geographical region, or within environments identified as compatible with the advertisement through means such as network identification, carrier ID, presence of a beacon, or dynamic computation of a region based upon prior propagation of the ad. For example, the ad may be allowed to continue propagating away from the point of introduction in a "wave" pattern, but may limit the lifetime within any given area. As another example, ads may have shortened displayed life when propagated back toward the point of introduction. As another example, when attempts are made to transfer ads after "expiration," or outside of preferred regions, there may be a fallback behavior attached to the ad. For example, simple cessation, fallback to more generic or alternate content, or possibly additional incentivization for having expanded the "reach" of the advertisements may be incorporated.

Figure 8:
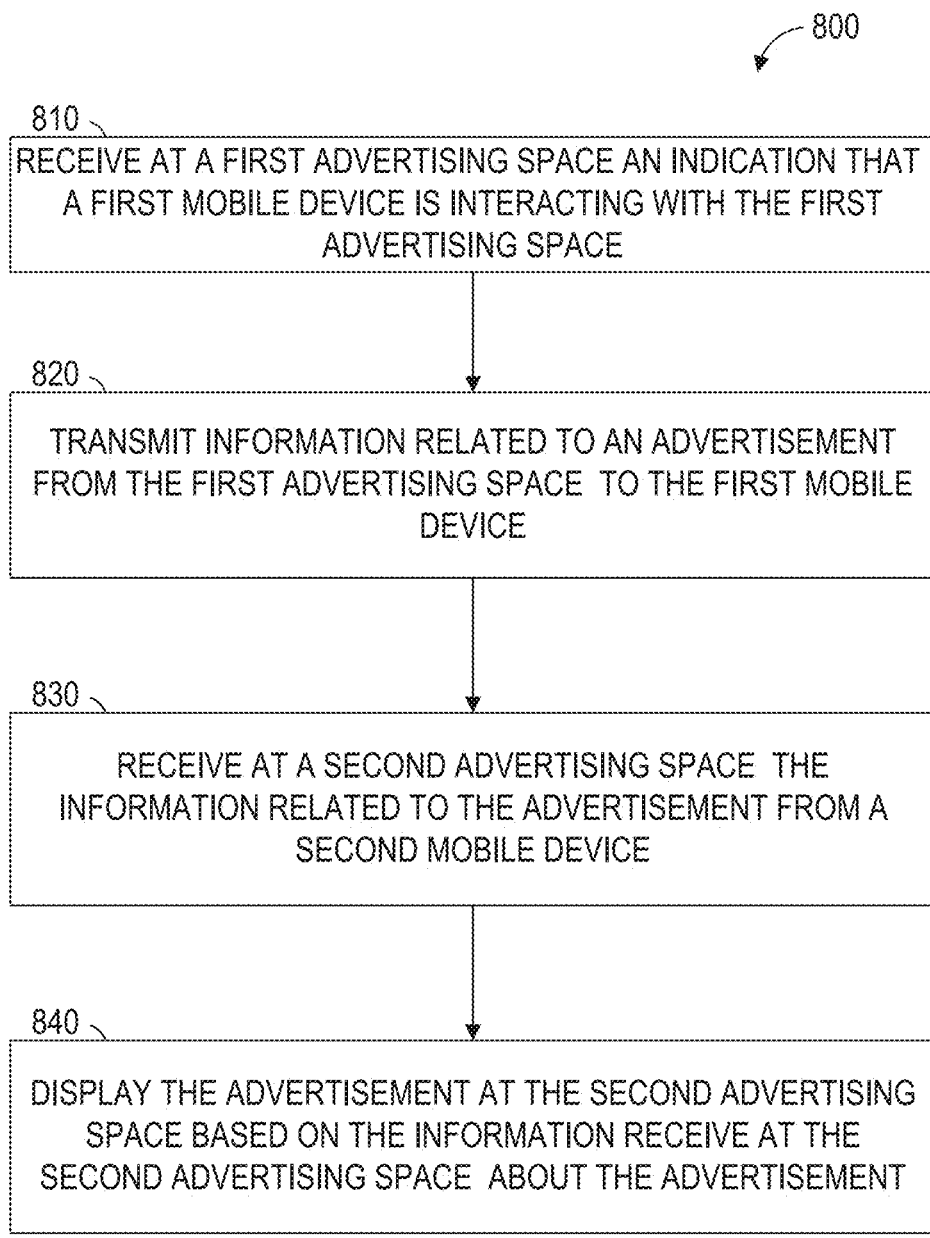
FIG. 8 is a flowchart illustrating example operations by a network of advertising spaces or advertising spaces for providing interactive advertisements, according to some example embodiments.

Referring to FIG. 8, a flowchart illustrates an example methodology 800 for providing interactive advertisements, according to aspects of the present disclosure, is shown. The example methodology 800 may be consistent with the methods described herein, including, for example, the descriptions in FIGS. 3, 4, 5, 6, and 7, and may be directed from the perspective of a network of advertising spaces controlled by a third party entity. Examples of an advertising space can include a display terminal, a billboard, a kiosk, or any other tangible medium configured to display advertisements. An example network of advertising spaces can include the descriptions of FIG. 2.

At block 810, a first advertising space may receive an indication that a first mobile device is interacting with the first advertising space. The first advertising space may be displaying an advertisement. An example mobile device, referred to herein, can include the example mobile device described in FIG. 1. An example advertisement can include the advertisement described in FIG. 3, but of course, many other advertisements are possible. The indication that the mobile device is interacting with the first advertising space can include any of the descriptions in FIGS. 3, 4, 5, 6, and 7. For example, the indication can include information that the mobile device is trying to access a QR code or RFID tag associated with the advertisement displayed on the first advertising space. As another example, the indication could include a wireless ping sent from the first advertising space to the first mobile device and is received back again.

At block 820, the first advertising space may transmit information related to the advertisement to the first mobile device. The information related to the advertisement can be a unique identifier distinguishing the advertisement from other advertisements, examples of which can include a QR code or RFID tag associated with the advertisement. In other cases, the information can include content descriptions, such as graphical information or audio information, sufficient to recreate the advertisement in another display, such as in a display of the first mobile device. In some cases, transmitting the information related to the advertisement can be in response to the indication that the first mobile device is interacting with the first advertising space. An example of transmitting the information related to the advertisement can include the descriptions of FIGS. 3 and 4.

At block 830, a second advertising space can receive the information related to the advertisement from a second mobile device. In some cases, the second mobile device and the first mobile device are the same. The second advertising space may be in a location geographically distinct from the first advertising space. In some cases, the mobile device first receiving the information related to the advertisement at the first advertising space may have traveled from the first advertising space to the second advertising space. In other cases, the first mobile device may have passed on the information related to the advertisement to a second mobile device. The second mobile device may in turn have traveled to the location of the second advertising space, At block 840, the advertisement may be displayed at the second advertising space based on information received at the second advertising space about the advertisement. Before this time, the second advertising space may not possess the information needed to display the advertisement. In some cases the advertisement can be displayed at the second advertising space only through receiving the information about the advertisement from a mobile device. The descriptions herein may be consistent with any of FIGS. 3, 4, 5, 6, and/or 7.

Figure 9:
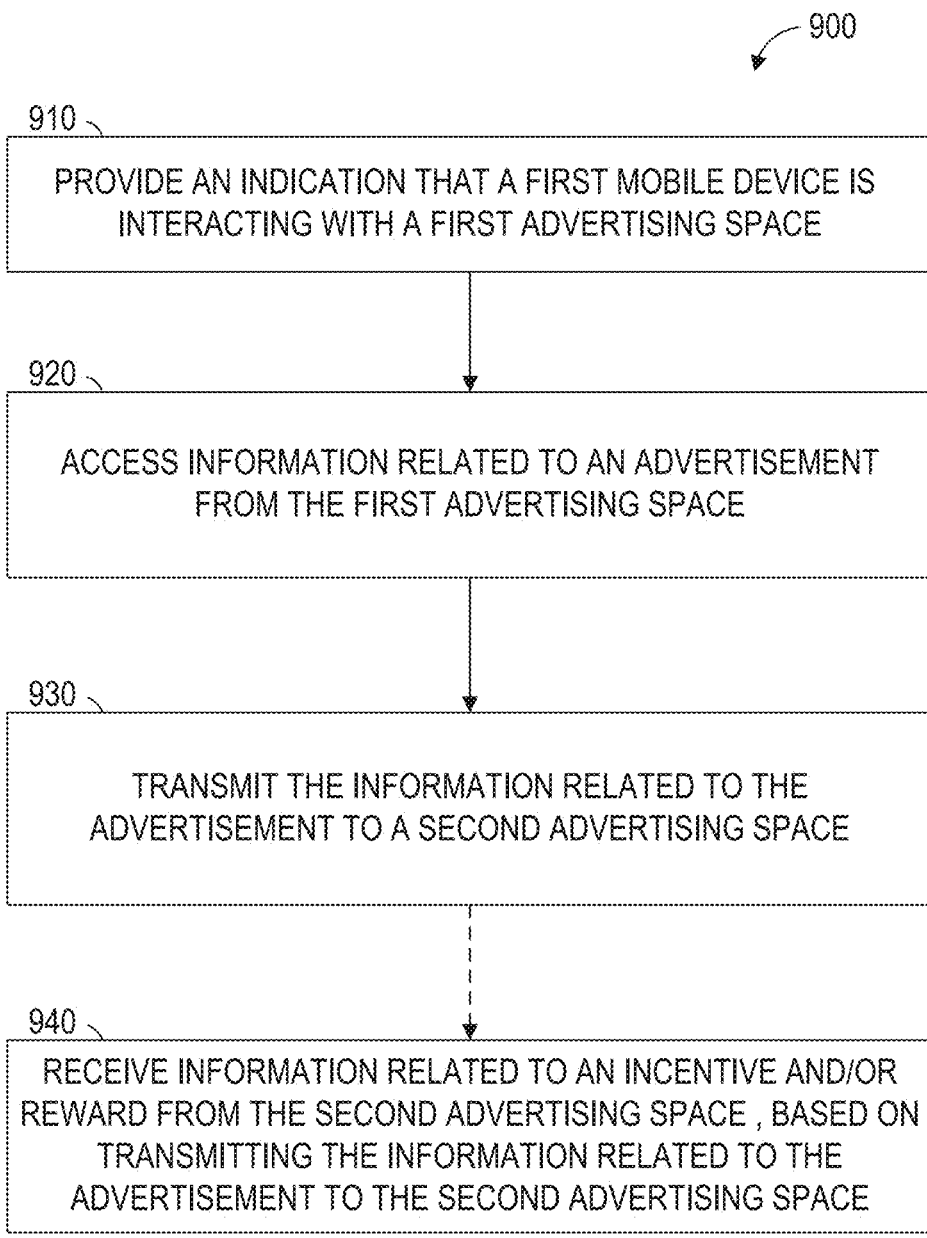
FIG. 9 is a flowchart illustrating example operations by one or more mobile devices for interacting with advertisements, according to some example embodiments.

Referring to FIG. 9, the flowchart illustrates another example methodology 900 for providing interactive advertisements, according to aspects of the present disclosure. The example methodology 900 may be consistent with the methods described herein, including, for example, the descriptions in FIGS. 3, 4, 5, 6, and 7, and may be directed from the perspective of one or more mobile devices interacting with one or more advertising spaces. At block 910, a first mobile device of a user may provide an indication that the mobile device is interacting with the first advertising space. Examples of an indication can include any of the examples described previously in the present disclosure.

A block 920, the first mobile device may access information related to an advertisement from the first advertising space. The mobile device may access the information by accessing a unique identifier visible at or near the advertisement at the first advertising space, such as a QR code or RFID tag. In some example embodiments, accessing the information can include downloading a digital copy of the advertisement. Example methods for accessing the information related to the advertisement may be consistent with any of the descriptions in FIGS. 3, 4, 5, 6, and/or 7.

At block 930, the first mobile device may transmit the information related to the advertisement to a second advertising space, where the second advertising space is in a location geographically distinct from the first advertising space. In some example embodiments, the first mobile device may transmit the QR code or RFID tag or other unique identifier associated with the advertisement to the second advertising space. In some example embodiments, the first mobile device may upload a copy of the entire advertisement to the second advertising space. In some example embodiments, a second mobile device may perform the operations at block 930, where the first mobile device transmitted the information related to the advertisement to the second mobile device. In some example embodiments, a third or fourth mobile device, and so on, may transmit the information related to the advertisement to the second advertising space, where the information related to the advertisement may have been transmitted across multiple mobile devices, ultimately being transmitted to the second advertising space. The descriptions herein may be consistent with any of the descriptions in FIGS. 3, 4, 5, 6, and/or 7.

At block 940, optionally, the mobile device may receive information related to incentive or a reward from the second advertising space. Incentive and/or reward may be based on transmitting the information related to the advertisement to the second advertising space. Examples of incentives or rewards can include discounts or coupons to a product related to the advertisement, or rewards related to games or other applications associated with the propagation of advertisements consistent with aspects of the present disclosure. Other examples of incentives or rewards may be consistent with any of the descriptions in FIGS. 3, 4, 5, 6, and/or 7.

Figure 10:
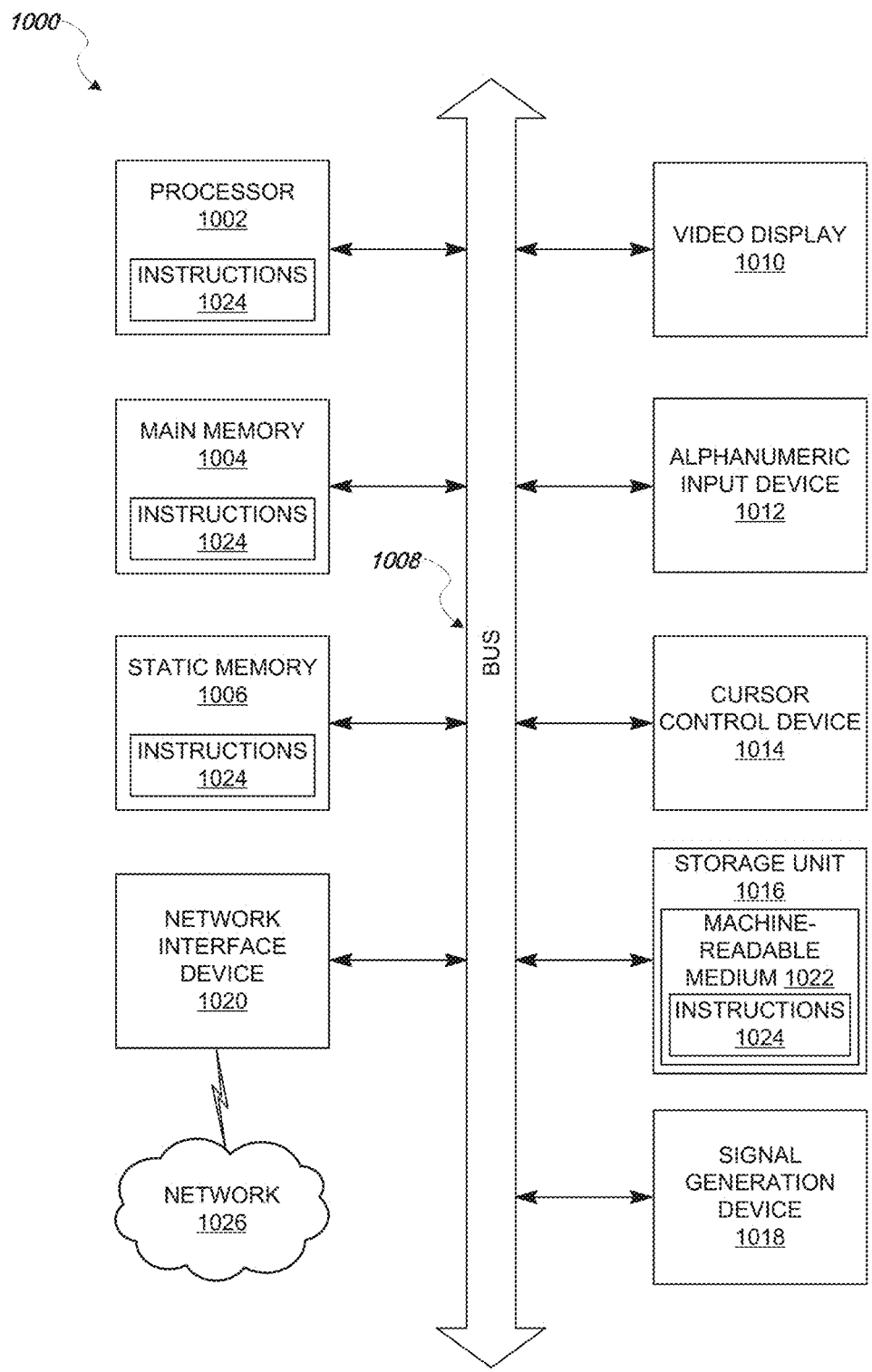
FIG. 10 is a block diagram illustrating components of a machine, according to some example embodiments, able to read instructions from a machine-readable medium and perform any one or more of the methodologies discussed herein.

Referring to FIG. 10, the block diagram illustrates components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine 1000 is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a video display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein, including, for example, any of the descriptions of FIG. 1, 2, 3, 4, 5, 6, 7, 8, or 9. The instructions 1024 may also reside, completely or at least partially, within the main memory 1004, within the processor 1002 (e.g., within the processor's cache memory), or both, before or during execution thereof by the machine 1000. The instructions 1024 may also reside in the static memory 1006.

Accordingly, the main memory 1004 and the processor 1002 may be considered machine-readable media (e.g., tangible and non-transitory machine-readable media). The instructions 1024 may be transmitted or received over a network 1026 via the network interface device 1020. For example, the network interface device 1020 may communicate the instructions 1024 using any one or more transfer protocols (e.g., Hypertext Transfer Protocol (HTTP)). The machine 1000 may also represent example means for performing any of the functions described herein, including the processes described in FIGS. 1, 2, 3, 4, 5, 6, 7, 8 and/or 9.

In some example embodiments, the machine 1000 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. As used herein, "hardware-implemented module" refers to a hardware module. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An electronic communication method performed by a computing device of a second advertising space comprising a display, one or more processors, and a wireless transceiver, the method comprising:

receiving, at the second advertising space from a first advertising space via an application implemented on a first mobile device, a wireless data signal comprising information related to an advertisement originally displayed at the first advertising space, wherein the second advertising space is in a first location geographically distinct from a second location of the first advertising space, and wherein the information is transmitted to the application implemented on the first mobile device from the first advertising space, and wherein the information is received by the application implemented on the first mobile device while the first advertising space displays the advertisement, and the information is received at the second advertising space from the application implemented on the first mobile device;

identifying, by the one or more processors, a unique identifier of the advertisement, wherein the information comprises the unique identifier;

in response to identification of the unique identifier, accessing, by the one or more processors, the advertisement at the second advertising space and initiating display of the advertisement at the second advertising space; and in response to the second advertising space receiving the information from the application implemented on the first mobile device, causing the display of the advertisement, that was originally displayed at the first advertising space, at the second advertising space based on the information related to the advertisement received from the application implemented on the first mobile device.

2. The method of claim 1, wherein the second advertising space further receives the information from a second mobile device, the method further comprising associating an age parameter with the advertisement that limits introduction of the advertisement into advertisement spaces from a time last present on a given advertisement space, wherein alternate content is provided in place of the advertisement in response to receiving a request to transfer the advertisement after a time specified by the age parameter.

3. The method of claim 1, further comprising associating a geographical region parameter with the advertisement that limits introduction of the advertisement into advertisement spaces within a geographical region, wherein alternate content is provided in place of the advertisement in response to receiving a request to transfer the advertisement outside of the geographical region.

4. The method of claim 3, further comprising transmitting information related to the incentive offer to the first mobile device, based at least in part on the receiving the information related to the advertisement at the second advertising space.

5. The method of claim 1, further comprising transmitting location information related to one or more locations that the information related to the advertisement travels, based at least in part on one or more locations traveled to by the first mobile device.

6. The method of claim 1, wherein the information related to the advertisement is received at a second mobile device from the first mobile device, wherein the information is transmitted to the application implemented on the first mobile device from the first advertising space by locally accessing the first advertising space with the first mobile device through a physical port and receiving a security code or authentication information from the first mobile device.

7. The method of claim 1, wherein a request from the first mobile device to access the information related to the advertisement is received at the first advertising space, and wherein transmitting the information related to the advertisement is further in response to the request.

8. A system comprising:
a first advertising space including a first display, a first transceiver, and a first processor;
a second advertising space in a location geographically distinct from the first advertising space, the second advertising space including a second display, a second transceiver, and a second processor;
the first advertising space configured to:
display an advertisement;
receive, at the first transceiver, an indication that an application implemented on a first mobile device of a user is interacting with the first advertising space while the first advertising space is displaying the advertisement; and in response to the indication, transmit information related to the advertisement to the application implemented on the first mobile device using the first transceiver, the information comprising a unique identifier associated with the advertisement, wherein the information is received by the application implemented on the first mobile device while the first advertising space displays the advertisement; and the second advertising space configured to:

receive, at the second transceiver, the information related to the advertisement from the application implemented on the first mobile device;

identify, by the second processors, the unique identifier associated with the advertisement;

in response to identification of the unique identifier, access, by the second processor, the advertisement at the second advertising space and initiating display of the advertisement at the second advertising space; and in response to the second advertising space receiving the information from the application implemented on the first mobile device, causing the display of the advertisement, that was originally displayed at the first advertising space, on the second display of the second advertising space based on the information related to the advertisement received at the second advertising space from the application implemented on the first mobile device.

9. The system of claim 8, wherein the second advertising space further receives the information from a second mobile device, and wherein an age parameter is associated with the advertisement that limits introduction of the advertisement into advertisement spaces from a time last present on a given advertisement space, wherein alternate content is provided in place of the advertisement in response to receiving a request to transfer the advertisement after a time specified by the age parameter.

10. The system of claim 8, wherein a geographical region parameter is associated with the advertisement that limits introduction of the advertisement into advertisement spaces within a geographical region, wherein alternate content is provided in place of the advertisement in response to receiving a request to transfer the advertisement outside of the geographical region.

11. The system of claim 10, wherein the second advertising space is further configured to transmit information related to the incentive to the first mobile device, based at least in part on the receiving the information related to the advertisement at the second advertising space.

12. The system of claim 8, wherein the system is configured to track locations that the information related to the advertisement travels, based at least in part on one or more locations traveled to by the first mobile device.

13. The system of claim 8, wherein the information related to the advertisement is received at a second mobile device from the first mobile device.

14. The system of claim 8, wherein the first advertising space is further configured to receive a request from the first mobile device to access the information related to the advertisement, and wherein transmitting the information related to the advertisement is further in response to the request.

15. A computer-readable medium having no transitory signals and embodying instructions that, when executed by a processor of a machine, cause the machine to perform operations comprising:

displaying an advertisement on a display of the machine coupled to the processor of the machine;

receiving, at a transceiver of the machine coupled to the processor of the machine, a wireless communication comprising an indication that an application implemented on a first mobile device of a user is interacting with a first advertising space comprising the display of the machine while the display is displaying the advertisement;

in response to the indication, transmitting information related to the advertisement to the first mobile device via the transceiver, the information related to the advertisement comprising a first unique identifier, wherein the information is received by the application implemented on the first mobile device while the first advertising space displays the advertisement; and in response to a second advertising space receiving the information from the application implemented on the first mobile device, causing a display of the advertisement, that was originally displayed at the first advertising space, at the second advertising space based on the information related to the advertisement received from the application implemented on the first mobile device.

16. The computer-readable medium of claim 15, wherein the second advertising space further receives the information from a second mobile device, the operations further comprising associating an age parameter with the advertisement that limits introduction of the advertisement into advertisement spaces from a time last present on a given advertisement space, wherein alternate content is provided in place of the advertisement in response to receiving a request to transfer the advertisement after a time specified by the age parameter.

17. The computer-readable medium of claim 15, the operations further comprising associating a geographical region parameter with the advertisement that limits introduction of the advertisement into advertisement spaces within a geographical region, wherein alternate content is provided in place of the advertisement in response to receiving a request to transfer the advertisement outside of the geographical region.

18. The computer-readable medium of claim 17, wherein the operations further comprise transmitting information related to the incentive to the first mobile device, based at least in part on the receiving the information related to the advertisement.

19. The method of claim 1 further comprising:

communicating a digital acknowledgement from the second advertising space to the first mobile device, the digital acknowledgement comprising an indication of the transfer of the advertisement to the second advertising space sufficient to signal completion of a condition associated with the advertisement.

20. The method of claim 1 further comprising:

updating, by the one or more processors of the second advertising space, tracking metadata for the advertisement with a location of the second advertising space, wherein the tracking data further comprises a location of the first advertising space; and initiating transmission of the tracking metadata to a networked server configured to aggregate tracking data of where the advertisement travels, wherein the tracking metadata further identifies when the advertisement was transferred to the second advertising space and a kind of mobile device used to transfer the advertisement.

* * * * *